Figure 1:
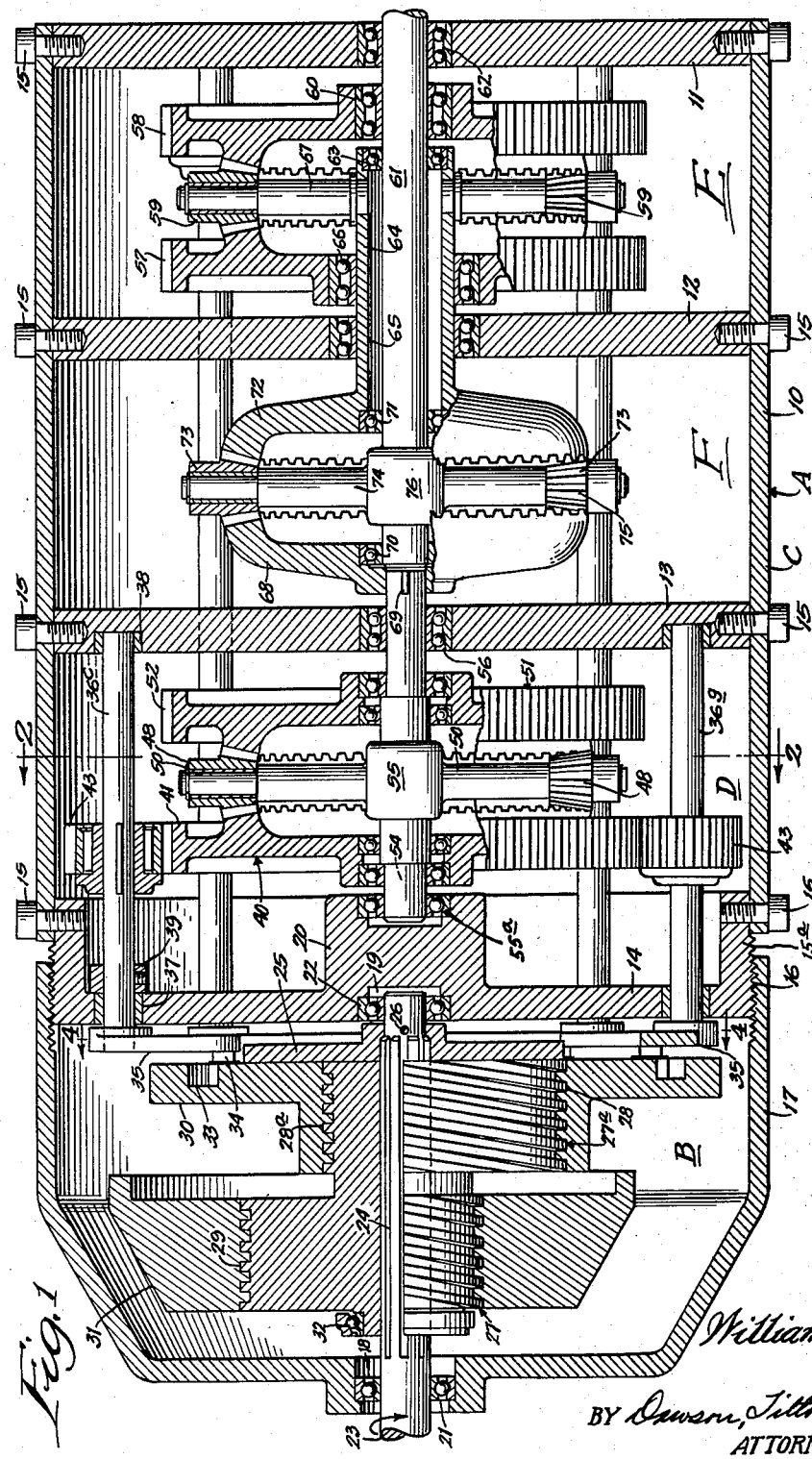

March 24, 1959 W. E. PALMER 2,878,688
VARIABLE TRANSMISSION
Filed March 16, 1953 3 Sheets-Sheet 1

INVENTOR:
William E. Palmer,
BY Dawson, Tilton & Graham,
ATTORNEYS.

March 24, 1959 W. E. PALMER 2,878,688
VARIABLE TRANSMISSION
Filed March 16, 1953 3 Sheets-Sheet 2
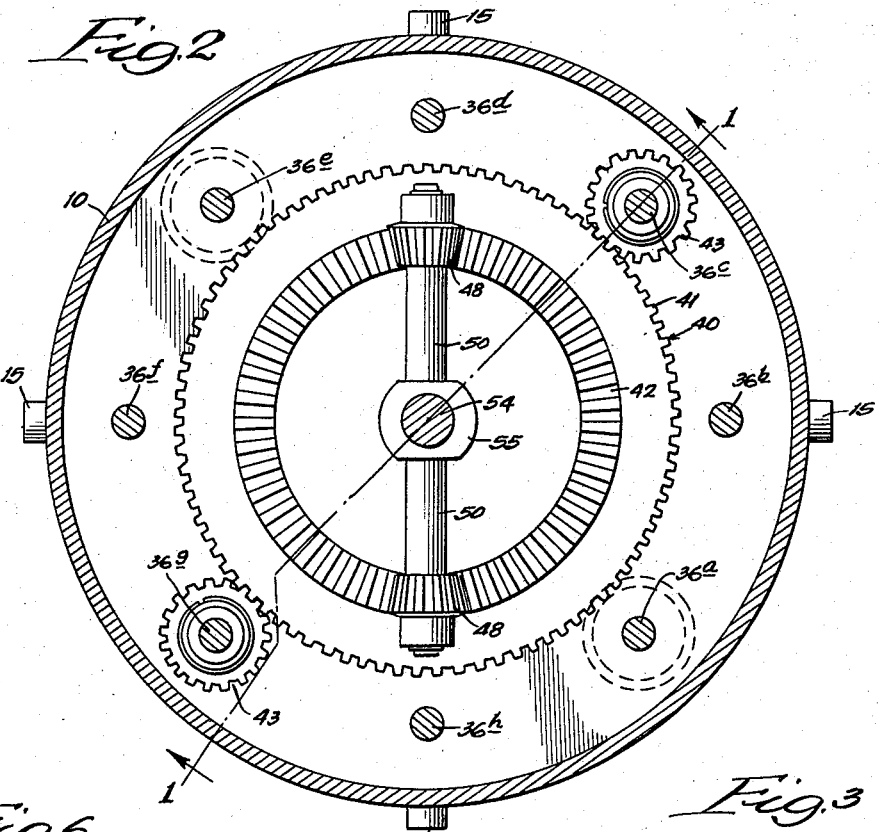
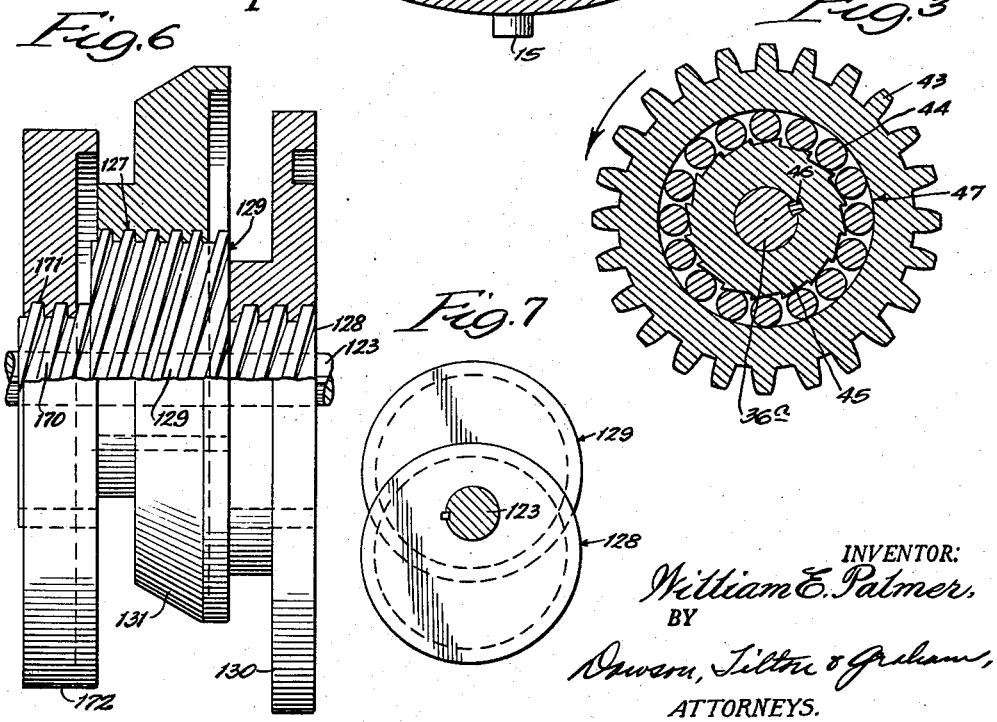
INVENTOR:
William E. Palmer,
BY
Dawson, Tilton & Graham,
ATTORNEYS.

March 24, 1959 W. E. PALMER 2,878,688
VARIABLE TRANSMISSION
Filed March 16, 1953 3 Sheets-Sheet 3
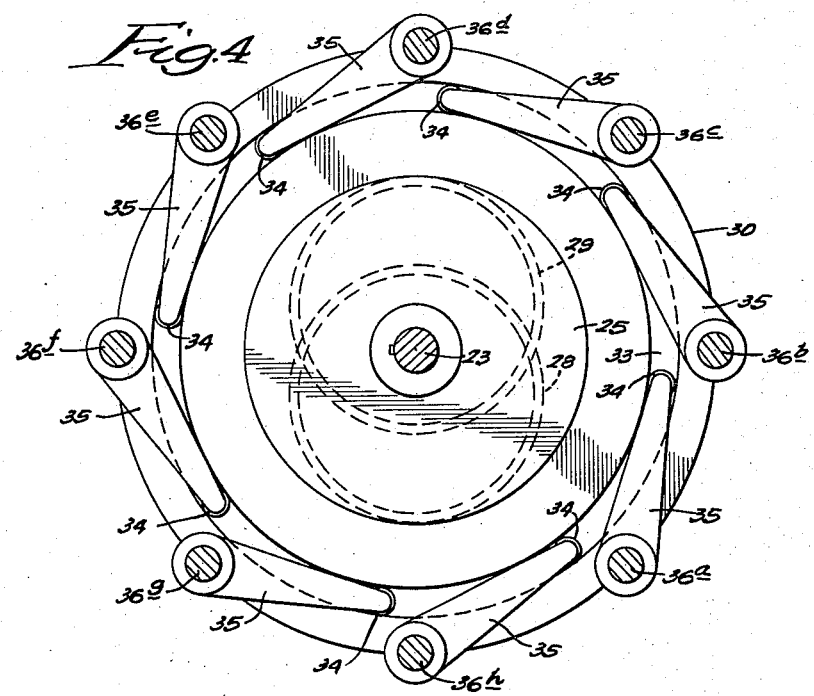
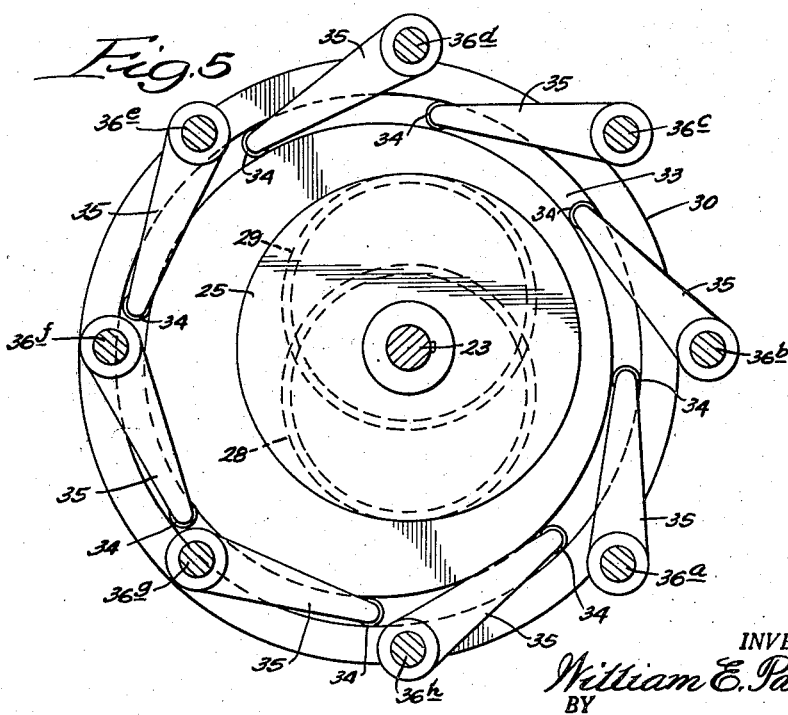
INVENTOR:
William E. Palmer,
BY
Dawson, Tilton & Graham,
ATTORNEYS.

United States Patent Office 2,878,688
Patented Mar. 24, 1959

2,878,688

VARIABLE TRANSMISSION

William E. Palmer, Chicago, Ill.

Application March 16, 1953, Serial No. 342,432

14 Claims. (Cl. 74—568)

This invention relates to a transmission and more particularly to a power transmission characterized by its capacity to vary infinitely its output speed and torque relative to the input speed and torque to provide a balancing of forces, and wherein a controlled gear ratio is provided to accomplish, for example, large speed reduction while maintaining very high mechanical efficiency.

Transmissions of the torque converter type are now in common use and conventionally these devices operate by means of a fluid coupling. The fluid employed is generally a liquid and rotary driving member is coupled to a driven member by the liquid. Particularly, in operating ranges where the driven member turns at a much lower rate of speed than the driving member, the mechanical efficiency of these devices is relatively low, since slippage in the liquid is relied upon to achieve this reduction in speed. Then too, with a fluid coupling, the driven member could never be run at a faster rate of speed than the driving member.

Other types of transmissions are of course known, but none of these, though slippage losses are avoided, have present the advantages of the torque converter wherein forces are balanced to provide infinitely variable output speeds and torques relative to the input speeds and torques, while at the same time the transmission output has an absolutely uniform speed for any given load when the input speed is uniform and in which the output speed of the transmission is selectively variable infinitely, including 0 or no speed, for any given input speed.

My transmission has innumerable applications and may be used to drive power machinery such as punch presses, lathes, etc.; it is adapted for the transmission of power in automotive vehicles; speed testing and synchronizing devices; in computing devices such as mechanical differential calculators in which it is necessary to have a uniformly variable range of output speeds in response to changes in input speed and torque; in other devices as where a constantly uniform output speed is a requisite for any given uniform input speed; and in applications where the input speed is very great, as where the input is provided by steam or gas turbines that must operate at very high speeds to be efficient, to provide controlled gear ratioing so that a relatively low speed high torque output is provided while maintaining a high mechanical efficiency.

An object of the invention is to provide a transmission that overcomes the disadvantages set out above of customary transmissions. Another object is to provide an infinitely variable transmission having a high mechanical efficiency. A further object is that of providing a transmission wherein the output speed is uniform for any given uniform load and input speed and in which the output speed may be selectively varied infinitely from 0 or no load speed to the maximum output speed for which the transmission is designed. Still another object is to provide a transmission in which the output speed may be made automatically responsive to changes in the input speed or output torque requirements. Still a further object is the provision of a transmission having a controlled gear ratio wherein the input speed may be translated as a greatly reduced output speed, while mechanical efficiency is maintained at a high value. Additional objects and advantages will appear as the specification proceeds.

Briefly stated, my transmission comprises an arrangement whereby a rotary input motion is converted into a plurality of relatively small reciprocating motions by means of an adjustable circular cam, and the reciprocating motions are then reconverted into rotary motion and combined to provide a uniform output speed, infinitely variable, and variously controlled.

It is believed that my invention can best be understood by referring to the drawings, in which—

Figure 1 is a longitudinal sectional view of my transmission taken on the line 1—1 of Fig. 2; Fig. 2 is a cross-sectional view taken on the line 2—2 of Fig. 1; Fig. 3 is a cross-sectional view of an overriding clutch for providing uni-directional rotary motion; Fig. 4 is a sectional view taken on the line 4—4 of Fig. 1 and showing the circular cam in neutral position; Fig. 5 is a view similar to that of Fig. 4 but showing the circular cam in a driving position; Fig. 6 is a sectional view, partly in elevation, of a modification; and Fig. 7 is an end view in elevation of the threaded plug with the cam and counterweights removed and taken from right end in Fig. 6.

Referring particularly to Fig. 1, I have designated my transmission generally by the letter A. The transmission A includes the adjustable circular cam input station B and a gear station C including planetary gear stations D and E where reciprocating motion is converted into rotary motion and a combining or output station F.

The elements of the transmission A are contained in a circular housing 10 having an end wall 11 adjacent the output end of the transmission, intermediate walls or supports 12 and 13 and an end wall 14 adjacent the input of the transmission. The walls 11 through 14 are secured to the housing 10 by cap screws 15. The end wall 14 has secured thereto an annular flange 15a having external threads 16 thereon adapted to receive the threaded inner portion of an adjustable housing 17.

The housing 17 is equipped with a central passage 18 axially aligned with a recess 19 provided in a hub 20 formed integrally with the end wall 14. Bearings 21 and 22 are received respectively in the passage 18 and recess 19 and mounted for rotation in the bearings is an input shaft 23 having splineways 24 thereon. Secured to the input shaft 23 adjacent the end wall 14 is a stop plate or abutment 25 that is prevented from moving relative to the shaft 23 by a pin 26. Splined on the shaft 23 is an adjustable plug 27 having an offset cam portion 28 adjacent the stop plate 25 and an offset counterweight portion 29. The plug 27 is threaded externally at both the offset portions 28 and 29 and threadedly received on the offset portion 28 is a circular cam 30, while threadedly received upon the threaded offset portion 29 is a counterweight 31. Interposed between the counterweight 31 and the end of the housing 17 is a thrust bearing 32.

Preferably, the threads on both of the offset portions 28 and 29 have relatively steep pitch so that a small rotation of the cam 30 or counterweight 31 relative to the plug 27 provides a relatively large axial movement of these members with respect to the plug. It is desired that the frictional engagement between the threaded offset portion 28 and the cam 30 and the counterweight 31 and offset portion 29 be held to a very low value and conceivably the threads of the offset portions 28 and 29 might be a continuous bearing upon which the cam 30 and counterweight 31 are mounted. The threads on the offset portions 28 and 29 are oriented so that upon rotation of the input shaft 23 in the clockwise direction, as viewed from the left end of the transmission or housing end as illustrated in Fig. 1, will cause both the cam 30 and the counterweight 31 to move inwardly or toward the right with respect to the plug 27. The reason for this will be hereinafter described.

The face of the circular cam 30 is equipped with a circular recess 33 in which a plurality of cam follower rollers 34 ride (seen best in Figs. 4 and 5). The cam follower rollers 34 are each carried on one of the cam arms or cam followers 35 that are secured at their outer ends to drive shafts. The drive shafts, there being eight in number, are given the numerals 36a, 36b, 36c, 36d, 36e, 36f, 36g and 36h. The cam arms or followers 35 are secured to the drive shafts 36 so that relative movement between the members is prevented with the result that reciprocating movements of the cam followers 35 rotate the drive shafts 36. The drive shafts 36 are carried in bronze bearings mounted in the end wall 14 and also in bronze bearings provided as necessary in the walls 11, 12, and 13. For purposes of making the description more clear, the drive shaft 36c is shown rotatably mounted in a bronze bering 37 in the end wall 14 and a similar bearing 38 in the intermediate wall 13. A stop member 39 secured to the shaft 36c by means of a set screw holds the shaft in position with the walls 14 and 13.

In Figures 1 and 4, the circular cam 30 is shown in neutral position wherein the offset portion 28 and the corresponding threaded offset bore 28a are in proper alignment. When in such position, rotation of the input shaft 23 will of course impart rotary movement to the cam 30 by means of the plug 28 which is splined on the input shaft, but since the cam is in neutral position, rotation thereof will not impart movement to the shaft 36 because the cam arms 35 will have no movement imparted thereto. In other words, when the cam 30 is in a neutral position the cam groove or recess 33 is coaxial with respect to the longitudinal axis of the input shaft 23 and no lateral deviations or movement of the cam arms 35 will result when the cam 30 is rotated. However, when the cam 30 is rotated relative to the plug 27 and offset portion 28 thereof in a manner subsequently described, the cam and the circular groove or recess 33 will no longer be concentric with respect to the longitudinal axis of the input shaft 23 and rotation of the cam plate 30 will cause consecutively each of the cam arms 35 to reciprocate between the in position illustrated by the arms 35 associated with the shafts 36a and 36b and the out position illustrated by the arms 35 connected to shafts 36e and 36f in Fig. 5. Obviously, the reciprocating movements of the cam arms 35 will cause the drive shafts 36 to rotate or pivot through a small angle and these reciprocating rotary movements of the shafts 36 will be utilized to drive the planetary gearing arrangements D and E.

The gear station C includes the planetary gearing arrangements D and E that are similar in construction and identical in operation. The combination in station D includes a planetary gear 40 that is in the nature of a ring gear having peripheral teeth 41 and laterally-extending teeth 42. A pair of spur gears or driving gears 43 mounted on shafts 36c and 36g mesh with the ring teeth 41 of the planetary gear 40 and drive the same. By referring to Figure 3 it will be clear that the spur gears 43 are mounted upon roller bearings 44 that are received upon a notched or toothed wheel 45 keyed by the member 46 to a shaft 36. The teeth of the wheel 45 are disposed so that rotation of the shaft 36 in one direction rotates the gear 43 while rotation of the shaft 36 in the opposite direction releases the bearings 44 from frictional engagement with the gear 43 and permits the shaft to rotate freely without imparting rotary motion to the spur gear 43. That is to say the spur gear 44 is operative in conjunction with an overriding clutch that will be designated generally by the numeral 47 and consists of the roller bearings 44 and the notched wheel 45. With this arrangement when the cam plate 30 is moved from the neutral position illustrated in Figure 4 and to some other position which may be for example the maximum position illustrated in Figure 5, the rotating circular cam 30 will impart reciprocating movements to the cam arms 35 which in turn will pivot the shafts 36 in a reciprocating manner through small arcuate distances. When a shaft 36 is rotated in a counterclockwise direction as seen in Fig. 3, the roller bearings 44 will ride up upon the inclined notched portions of the wheel 45 and will be forced into frictional engagement with the spur gear 43 associated therewith and the spur gear will thereby be driven or rotated in a counterclockwise direction. On the other hand, when the end of the cam arm 35 connected to the cam follower 34 is pivoted inwardly by rotation of the cam plate 30, the drive shaft 36 associated therewith will be rotated in a clockwise direction as viewed in Fig. 3, and the bearings 44 will be released from frictional engagement with the notched wheel 44 and spur gear 43 and the gear will remain stationary and will not rotate in the clockwise direction.

Figures 4 and 5 indicate clearly that the shafts 36 are disposed at 45 degree intervals and a pair of shafts 36 are associated with the planetary gear 40 and as will be seen hereafter, a pair of shafts 36 are arranged with each of the planetary gears in the stations D and E. The shafts 36 associated with each planetary gear are spaced apart by 180° so that a complete rotation of the cam plate 30 when off of neutral position will rotate both of the shafts associated with each planetary gear and two separate rotary motions will be imparted to each planetary gear and these motions will be 180° out of phase.

Rotation of the planetary gear 40 will drive a pair of beveled pinion gears 48 equipped with teeth that mesh with the laterally-extending teeth 42 of the planetary gear. The pinion gears 48 are mounted upon bronze bearings 49 secured to the reduced end portions of a shaft 50. The pinions 48 are secured upon the reduced end portions and bearings 49 by means of a snap ring or clamping collar 50.

A second planetary gear 51 having a ring gear portion 52 and a laterally-extending tooth portion 53 is rotatably driven by a pair of spur gears and over-riding clutches identical to the spur gears 43 and clutches 47 previously described. The spur gears are mounted upon shafts 36a and 36e disposed at opposite ends of a diameter through planetary gear 51 and spaced apart by 90° from the drive shafts 36c and 36g arranged with the planetary gear 40. Rotary motion is imparted to the planetary gear 51 through the spur gears and shafts 36a and 36e by rotation of the cam plate 30 in a manner identical with the way the planetary gear 40 is rotated.

The direction of rotation of both the planetary gears 40 and 51 will be the same. For example, both may rotate in a clockwise direction when viewed from the left of the transmission as illustrated in Fig. 1. Since both of the gears 40 and 51 have laterally-extending portions 42 and 53 respectively, meshing with the teeth of the pinion gears 48, rotation of the planetary gears will result in the attempt to drive each of the pinion gears simultaneously in opposite directions. This, of course, cannot occur and the pinion gears 48 will revolve about a central axis. The central axis about which the pinions 48 revolve is provided by an intermediate shaft 54 rotatably mounted in bearings 55a and 56 secured respectively in the hub 20 of the end plate 14 and a passage in the intermediate plate or wall 13. The planetary gears 40 and 51 are in turn rotatably mounted upon bearings carried by the shaft 54. The shaft 54 is provided intermediate its ends with a collar 55 to which is secured the opposite end portions of the shaft 50. The collar 55 is rigidly carried upon the shaft 54 with the result that as the pinions 48 revolve, the shaft 50 also revolves and it causes the shaft 54 to rotate.

In the structure described thus far comprising the planetary gear station D, the speed curve of the planetary gear 40 will be two cyclical portions 180° out of phase. The speed curve for the planetary gear 51 will also be two cyclical portions 180° out of phase and each of the cyclical portions will be 90° out of phase with the cyclical portions of the speed curve representing the rotary motion of the planetary gear 40. When the respective speed curves of gears 40 and 51 are combined, the speed of revolution of the pinion gears 48 and the shaft 54 will be the average speed of the planetary gears. However, the speed will not be uniform and will vary slightly above and below the minimum or average speed value.

The planetary gear station E is similar to the station D and includes a pair of planetary gears 57 and 58 each having ring gear portions and laterally-extending gear portions engaging a pair of pinion gears 59 diametrically opposed. The planetary gear 57 is driven by a pair of spur gears and overriding clutches similar to the gears 43 and clutches 47 previously described which are mounted upon the shafts 36d and 36h pivotally driven in a reciprocating motion by cam arms 35 as previously described. In the same manner the planetary gear 58 is driven by a pair of spur gears and overriding clutches mounted upon the drive shafts 36b and 36f. The shafts 36b and 36f are spaced apart by 180° as are the drive shafts 36d and 36h. All of the shafts in this arrangements are disposed at 90° separations with respect to each other as are the drive shafts in combination comprising the planetary gear station D.

The planetary gear 58 is rotatably mounted upon a bearing 60 carried on a shaft 61. The shaft 61 is the transmission output shaft and is rotatably supported adjacent its outer end in a bearing 62 carried in a passage or aperture provided by the end wall 11. The output shaft 61 is supported intermediate its ends upon a bearing 63 carried in the end of a sleeve 64 coaxial with the output shaft 61. The sleeve 64 is in turn rotatably mounted in a bearing 65 carried in a suitable passage provided by the intermediate plate 12. Rotatably mounted upon the sleeve 64 by means of bearing 66 is the planetary gear 57.

The pinion gears 59 are rotatably mounted on bronze bearings carried by the reduced ends of a shaft or axle 67. The shaft 67 is interrupted at its central portion and the individual sections thereof are rigidly carried by the sleeve 64. It is apparent that as the circular cam 30 is rotated when moved from its neutral position it thereby imparts reciprocating movements to the cam arms 35, the drive shafts 36b and 36f and 36d and 36h will be reciprocated through small arcuate distances and drive the spur gears associated therewith through the overriding clutches and the planetary gears 47 and 58 will be rotated. The pinion gears 59 will thereby be revolved as will the shaft 67 on which they are mounted and in turn the sleeve 64 to which the shaft portion 67 is secured. The graph or speed curve of the planetary gears 57 and 58 will be similar to that of the planetary gears 40 and 51 and the rotary motion of the sleeve 65 will not therefore be uniform, but will vary above and below of the average speed.

In the structure thus far described the shaft 54 is rotatably driven by the planetary gearing arrangement designated generally by the letter D and the speed of rotation of the shaft 54 will be equivalent to the average speeds of the planetary gears 40 and 51. The speed will not be completely uniform and will vary somewhat above and below the average speed of rotation. The sleeve 65 will be driven in a similar manner by the planetary gearing arrangement E and its speed of rotation will be equal to the average rotary speeds of the planetary gears 57 and 58 and will vary somewhat above and below the average speed. The rotary motions of the shaft 54 and sleeve 65 are combined in the combining and output station F and are utilized to drive the output shaft 61. The speed of rotation of the output shaft 61 will be uniform since by combining the rotary motions of all of the planetary gears as translated into rotary motion of the shaft 54 and sleeve 65 any variation in the speed of rotation of the output shaft 61 will be imperceptible and the output shaft may be considered to be rotating at a uniform speed.

The combining and output station F comprises another planetary gearing arrangement wherein a planetary gear 68 is mounted upon the end of the shaft 54 and a key 69 locks the gear with respect to the shaft so that the gear 68 is rotatably driven by the shaft 54. The inner end of the output shaft 61 extends adjacent the planetary gear 68 and is equipped with a bearing 70 upon which the gear 68 is mounted. Spaced axially from the bearing 70 is another bearing 71 that provides a support for the inner end of the sleeve 65 while permitting free rotation of the sleeve with respect to the output shaft 61. A second planetary gear 72 is formed integrally with the inner end of the sleeve 65. However, this construction is not essential and any other arrangement may be provided wherein the planetary gear 72 is freely rotatable with respect to the output shaft 61 and is rotatably driven by the sleeve 65.

Both the planetary gears 68 and 72 are rotatably driven in the same direction since the shaft 54 and sleeve 65 rotate in identical directions. Therefore, the pinion gears 73 which are rotatably mounted upon bronze bearings provided at the reduced ends of a common shaft or axle 74 revolve about the axis provided by the output shaft 61, the beveled teeth 75 of the pinion gears 73 of this meshing with the teeth of the planetary gears 68 and 72. Both sections of the shaft 74 are rigidly secured to a central collar 76 carried by the shaft 61 and locked thereon to prevent relative movement therebetween. It is clear then that as the pinions 73 and the shaft 74 revolve due to the rotary motion of the planetary gears 68 and 72, the output shaft 61 is rotatably driven.

To make clear the reason that the output shaft 61 rotates at a uniform speed for any given load thereon and rotary speed of the input shaft 23, the following explanation is given: The eight drive shafts 36 are arranged in a circular configuration as is clear in the illustration of Figs. 4 and 5. The shafts are spaced apart by 45° and each pair of shafts that are spaced apart by 180° are used to drive one of the planetary gears in the station D or E. However, the four shafts 36 used to drive the two planetary gears in the stations D and F are spaced apart by 90° so that as the cam 30 rotates, the planetary gear 40, for example, is first rotated by movement of the shaft 36c and following this the planetary gear 51 would be rotated by movement of the shaft 36e and the next rotation would be that of the gear 40 by rotation of the shaft 36g while the gear 51 would next be rotated by movement of the shaft 36a. In between each of these movements the planetary gears 57 and 58 in the station E are driven alternately in the same manner.

The rotary motion of each of the planetary gears is then alternating between a slow and then a fast rotation, but since one of the planetary gears is rotating slowly while the other in any station is rotating rapidly, the pinion gears are revolved at a fairly uniform rate, although the speed of revolution does vary slightly. However, when these fairly uniform speeds of rotation are again combined in the station F, the resultant speed of revolution of the pinions 73 and output shaft 61 is uniform.

As previously brought out, the housing 17 is threadedly received upon the end wall 14 carried by the casing 10. By reference to Figure 1 it will be clear that the housing 17 can be rotated in a clockwise direction with respect to the end wall 14 to draw the housing to its most inward position with respect to the end wall and casing 10. In this position the housing abuts the thrust bearing 32 and prevents axial movement of the plug 27 upon the input shaft 23. In other words, the plug 27 will be locked between the stop plate 25 and the housing 17 and though free to rotate, it cannot move axially. On the other hand, the housing 17 may be rotated in a counterclockwise direction to any desired position with respect to the end wall and casing and the plug 27 will therefore be free to move axially upon the input shaft 23 within the limits provided by the stop plate 25 and housing 17. The position of the plug 27 upon the input shaft 23 is important because it determines both the speed of rotation of the output shaft 61 with respect to any given input speed of the shaft 23 and also the torque that is available at the output shaft 61. Although the adjustable housing 17 is shown as a means for determining the position of the plug 27, this has been done for purposes of simplicity and it is believed apparent that other modes of limiting and adjusting the position of the plug 27 upon the input shaft 23 may be provided. For example, an adjustable stop member might be carried in the end wall of the housing 17 and its adjustment would determine the position of the plug 27. Also, a fork-type connection might be provided with the plug 27 so that upon movement of a lever extending through the housing 17 the position of the plug 27 would be established. Further, the plug 27 might be arranged in combination with a servo motor such as those commonly used in hydraulic governors and movement of the governor servo would thereby determine the position of the plug 27.

Operation

In operation consider first the neutral position of the cam member 30 provided by positioning the housing 17 inwardly relative to the casing 10 so that axial movement of the plug member 27 is prevented by its abutment on one side with the stop member 25 and on the other side with the end wall of the housing 17 and thrust bearing 32. The input shaft 23 is then connected in any suitable manner to a power source that may be, for example, the engine of an automotive vehicle or any other desired power source. Rotation of the shaft 23 rotates the plug member 27 and the circular cam 30 as well as the counterweight 31 are also rotated. This is the neutral position and the cam groove or recess 33 of the circular cam 30 subscribes an arc that is uniform and coaxial with the longitudinal axis of the input shaft 23. The cam arms 35 do not reciprocate and all of the drive shafts 36 are therefore immobilized. The planetary gears and pinion gears do not move and the output shaft 61 is not rotated.

If the housing 17 is turned to move it outwardly or to the left as viewed in Fig. 1, the plug 27 is free to move axially upon the input shaft 23. The threads on the eccentric or offset portion 28 of the plug 27 are disposed so that rotation of the plug member tends to move the circular cam 30 to the right or to a more inward position. However, the circular cam 30 is abutting the stop member 25 and cannot move to the right (Fig. 1) and as a result of the thread disposition, the inertia of the cam, and the centrifugal forces, the plug 27 is driven outwardly or toward the left. Since the circular cam 30 is balanced or concentric with respect to the input shaft 23 in only one axial position upon the eccentric or offset portion 28 of the plug member, axial movement of the plug therefore offsets or unbalances the circular cam 30 with respect to its rotational axis which is the longitudinal axis of the input shaft 23. Such position is illustrated in Fig. 5.

When the cam 30 is offset, the cam groove 33 will not subscribe an arc or circle that is concentric with the input shaft 23 and rotation of the cam 30 will therefore cause the cam arms 35 to reciprocate with a pivotal motion about the respective axis of each of the shafts 36. Each of the drive shafts 36 will therefore in consecutive order reciprocate or pivot with a back and forth motion and the spur gears mounted upon the shafts 36 will also rotate, but only in one direction because of the action of the overriding clutches 47. The planetary gears are thereby driven and the output shaft 61 rotates. The greater the axial movement of the plug member 27 upon the input shaft 23 while the cam member 30 remains in abutting relation with the stop plate 25, the greater will be the offset of the cam member and the greater will be the arc through which the cam arms or followers 35 and the shafts 36 reciprocate. The resultant speed of the output shaft 61 will therefore increase.

However, as the output speed increases, the output torque decreases proportionally until it balances the torque requirements of the load. At this point, no further increase in output speed is possible, since the resistance of the load, reacting through the gearing to the cam arms 34, tends to force the cam 30 back to its neutral position. The torque converter would then be in a state of equilibrium and there would not be any more lateral movement of the threaded plug 27 as long as input and output speeds and torques remained constant. The output speed can be reduced any desired amount, however, by using the threaded section of the housing, acting against the throw-out bearing 32, to force the threaded plug 27 to the right, thus reducing the amount of offset of cam 30 and counterweight 31.

Because of the inertia of the counterweight 31, its unbalance resulting from the offset bore therethrough, and because of the angular disposition of the threads upon the eccentric or offset portion 29 of the plug 27, rotation of the plug member 27 will tend to move the counterweight 31 inwardly or toward the right as viewed in Fig. 1 and the movement will continue until the counterweight engages the rim of the cam member 30. The counterweight 31 will then rotate at the same speed of rotation obtained by the plug 27 and also by the cam 30, and because the offset or eccentric 29 is opposed or in the direction opposite to that of the eccentric or offset 28, the unbalance or offsetting attained by the cam 30 will be neutralized by the equal but opposite offsetting of counterweight 31 with respect to the input shaft and a static balance will be provided wherein the force resulting from the unbalance of the cam 30 will be balanced statically by the force resulting from the unbalance of the counterweight 31.

It is believed clear that the speed of rotation of the output shaft 61 for any given load thereon and speed of the input shaft 23 is determined by the axial position of the plug 27 upon the input shaft 23 which in turn determines the degree of offset attained by the cam 30. Therefore, the rotational speed of the output shaft may be varied infinitely from 0 or no load speed to the maximum speed for which the transmission is designed by simply adjusting the position of the housing 17, since this limits the extent of movement of the plug member 27.

Assuming that the housing 17 is moved to the outermost position of adjustment providing a large space through which the plug 27 may move freely with respect to the shaft 23, the plug 27 will move axially on the input shaft 23 only the distance necessary to provide an offsetting of the cam member 30 sufficient to rotate the output shaft 61 at the speed of rotation and with the available torque that will balance the speed and torque of the input shaft 23 for the particular transmission design. When this position is attained, the plug 27 will not move axially in either direction. If the input shaft 23 is then rotated at a higher rate of speed and the load on the output shaft 61 remains constant, the plug 27 will move outwardly until the speed of the output shaft 61 is increased sufficiently to again provide a balance with the input shaft, or as the speed of the input shaft 23 decreases, plug 27 will move in the opposite direction to decrease the rotary speed of the output shaft 61 and rebalance the system.

If conditions are static and the load on the output shaft 61 is suddenly increased, the speed of rotation thereof decreases and the added load on the system causes the plug 27 to move inwardly in an effort to offset the cam 30 to a lesser extent to balance the ratio of speed and torque of the output shaft 61 with that of the input shaft 23. Though the rotary speed of the output shaft 61 decreases, the movement of the plug 27 and corresponding offsetting of the cam 30 considerably increases the torque available at the output shaft by a related amount. It is seen then that the speed and torque of the output shaft vary inversely.

From the above it is apparent that the output speed of the shaft 61 for any particular transmission design depends upon the input speed of the shaft 23 and the axial position of the plug 27 which establishes the offset of the cam 30 for any given load on the output shaft. This is important and permits the transmission to be used in mechanical differential calculators wherein these conditions are essential and wherein the output shaft must rotate at a uniform speed for any given load thereon and input speed. It has also been seen that the speed of the output shaft 61 may be varied infinitely from 0 to the maximum speed for which the transmission is designed and this variation in speed takes place without slippage or other losses occurring or, stated in another way, while the mechanical efficiency is maintained at a high level. Therefore, the transmission may be used without excessive mechanical inefficiency with power units such as steam or gas turbines where the input speed will be tremendously high while the useful portion of the speed is some greatly reduced value. By determining the extent of movement of the plug 27, the speed of the output shaft 61 is thereby determined and without excessive losses occurring in the transmission, the high speed input is reduced to a useful value.

If the transmission is to be used in automotive vehicles or in other installations where it is necessary to reverse the direction of movement or the direction of rotation of some part, suitable reversing gear trains may be provided, preferably at the output end of the transmission, or the system of eight overriding clutches, 43, could be made reversible. Other types of friction clutches can in fact be used in the place of the overriding clutches and can be made to engage and disengage automatically, or can be made to engage or disengage at will by an outside control. If used in automobiles, the transmission provides an automatic hill holder effect, since the output shaft 61 cannot be turned in the direction opposite to the rotation of the input shaft 23 because the effort would move the cam arms 35 toward the rotational axis of the cam 30 and the cam followers 34 would bind in the cam groove 33 and prevent movement thereof.

In Figs. 6 and 7 I have illustrated a modified form of my invention. The modified form illustrated is in reality the preferred form, in that with this structure my variable transmission is dynamically balanced at all speeds as well as being statically balanced. The embodiment of the invention heretofore described is statically balanced at all speeds but is not dynamically balanced at all speeds.

The modified form of the invention is identical with the embodiment illustrated in Figs. 1 through 5, with the exception of a single change made at the input end of the transmission which is illustrated in Figs. 6 and 7. For convenience and clarity the parts in Figs. 6 and 7 are numerically designated with the same numbers heretofore used except that 100 has been added to each number. In these figures the driving or input shaft 123 is equipped with a plug 127 having an offset portion 128 threadedly receiving the cam 130 and is also equipped with an oppositely disposed offset portion 129 which provides a mounting for counterweight 131. Both of the offset portions 128 and 129 are provided with threads oriented in the left-hand direction and these members are operative with the counterweight 131 and cam 130 in the identical manner that has been hereinbefore described with particular reference to Figs. 1 through 5. In the modification the plug 127 is equipped with a further offset portion 170 having threads 171 thereon that are oriented in the same direction as the threads of the offset portions 128 and 129. The offset portion 171 is in axial alignment with the offset portion 128 so that these two members are identically disposed relative to the driving shaft 123. The offset portion 171 threadedly receives a counterweight 172. In this arrangement the counterweight or counterbalance 131 should be equal in weight and size to the combined weights and sizes of the cam 130 and the counterweight 172.

The operation of this modified transmission is no different than the operation before described and the additional counterbalance or counterweight 172 abuts the counterweight 131 and rotates with the counterweight 131 and cam 130 during operation of the transmission. The addition of the offset portion 170 and counterweight 172, however, provides a variable transmission that is both statically and dynamically balanced at all operating speeds.

While in the foregoing specification I have set forth an embodiment of my invention in considerable detail for purposes of illustration, it will be apparent that changes may readily be made by those skilled in the art without departing from the spirit of the invention.

I claim:

1. In an infinitely variable transmission, a casing, an input shaft rotatably mounted in said casing and adapted to be rotated by a power source, a plug mounted on said shaft and adapted to be rotatably driven thereby while being freely movable axially thereon, said plug having a first eccentric portion and an eccentric portion opposed thereto and spaced axially therefrom, both of said portions being equipped with external threads, a circular cam threadedly mounted upon said first eccentric portion, and a circular counterweight threadedly mounted upon said second eccentric portion, both said cam and said counterweight having eccentric bores therethrough equipped with threads and receiving the threaded eccentric portion of said plug, whereby in one axial position upon the eccentric portions of said plug, said cam and counterweight when rotated subscribe a circle concentric with the longitudinal axis of said input shaft and in other axial positions upon the plug eccentric circles are subscribed by the rotation of said cam and counterweight.

2. In an infinitely variable transmission, a rotatably mounted input shaft adapted to be rotated by a power source, a plug mounted on said shaft and being free to move axially thereon while being locked against relative rotation with respect to the shaft, said plug having a first eccentric portion and a second eccentric portion spaced axially therefrom, both of said portions being equipped with external threads having the pitch thereof oriented to produce inward movement of members mounted thereon with respect to said plug during the rotation thereof, a cam having an eccentric bore therethrough threaded to receive said first eccentric portion, a counterweight having an eccentric bore therethrough rotated to receive said second eccentric portion whereby the rotation of said plug tends to move said cam and said counterweight inwardly due to the intertia of said cam and counterweight, means to restrain inward movement of said counterweight whereby said plug is moved outwardly to change the disposition of said cam upon said first eccentric portion, and means to selectively limit the outward movement of said plug.

3. The structure of claim 2 wherein the means to restrain inward movement of said cam is a stop member rigidly secured to said input shaft.

4. In an infinitely variable transmission, a casing, an input shaft rotatably mounted in said casing and adapted to be rotatably driven, a plug member splined on said shaft for free axial movement with respect thereto, a stop member rigidly mounted upon said shaft adjacent the inner end of said plug, said plug having a first cylindrical portion with the longitudinal axis thereof offset from the rotational axis of said plug and a second cylindrical portion spaced from said first portion and having the longitudinal axis thereof offset with respect to the rotational axis of said plug and opposed to the longitudinal axis of said first cylindrical portion, a cam having a bore therethrough adapted to receive the first cylindrical portion of said plug and a counterweight having a bore therethrough adapted to receive the second cylindrical portion of said plug, said offset portions and said bores being threaded and having the threads thereof disposed so that rotation of said plug tends to shift both said cam and counterweight in an inward direction, said plug and said cam being arranged so that when the cam and said first offset portion abuts said stop member any point on said cam will subscribe a circle when said cam is rotated by the rotation of said plug and input shaft, whereby when said input shaft is rotated said cam abuts said stop member and said plug is moved outwardly with respect thereto and the position of said cam upon said first cylindrical portion is altered with the result that the circle subscribed by a point on said cam during the rotation thereof is eccentric with respect to the rotational axis of the cam, and means for selectively determining the extent of axial movement of said plug member.

5. The structure of claim 1 in which said plug is equipped with a third eccentric portion opposed to said first eccentric portion and threadedly receiving a counterweight.

6. The structure of claim 2 in which said plug is equipped with a third eccentric portion spaced axially from said second eccentric portion and in axial alignment with said first eccentric portion, and a counterweight threadedly mounted upon said third eccentric portion and being operable with said cam and first-mentioned counterweight.

7. In a transmission of the character described, a casing, an input shaft rotatably mounted in said casing, a plug mounted upon said shaft and being axially movable therealong but constrained against relative rotational movement with respect thereto, said plug being equipped with a pair of oppositely oriented eccentrics spaced from each other longitudinally along the axis of said shaft and each having threads extending in the same direction, a cam provided with a threaded eccentric bore therethrough corresponding with one of the aforesaid eccentrics and being threadedly received thereon, a counterweight provided with a threaded eccentric bore therethrough corresponding with the other of the aforesaid eccentrics and being threadedly received thereon, and means for constraining movement of said cam and counter-weight relative to said plug at preselected positions therealong, said cam being adapted to impart driving torque to apparatus coupled thereto at certain of said preselected positions thereof along said plug.

8. In apparatus of the character described, a casing, a shaft supported for rotation therein about its longitudinal axis, a plug mounted upon said shaft and being locked thereon against relative rotational movement with respect thereto but being movable longitudinally therealong, a cam threadedly mounted upon said plug and a counter-weight also threadedly mounted upon said plug, said plug being provided with an eccentric portion providing a mounting for said cam and said plug providing a further eccentric affording a mounting for said counterweight and being oppositely oriented from the aforesaid eccentric, said cam and plug being interrlated so that at one axial position of the cam on the plug its rotation is concentric with the rotational axis of said shaft, but at other axial positions thereon its rotation is eccentric with respect to the longitudinal axis of the shaft, and means for determining the axial position of said cam along said plug.

9. In a transmission structure of the character described, a casing having a shaft rotatably mounted therein, said shaft being adapted to be rotated by an input source, a plug carried by said shaft and being movable longitudinally therealong, means for constraining said plug against rotational movement with respect to said shaft, said plug having an eccentric, a cam mounted upon said eccentric, thread means operative between said plug and eccentric for effecting relative axial movement therebetween upon relative rotational movement therebetween, said cam and eccentric being interrlated so that the cam at one axial position thereof along said eccentric rotates concentrically with the axis of said shaft, but at other positions therealong has an eccentric rotation with respect thereto, whereby said cam when at such other positions imparts a torque, when rotated, to output means coupled thereto.

10. The apparatus of claim 9 in which means are provided for determining the position of said plug axially along said eccentric.

11. The structure of claim 10 in which said means comprises a stationary stop to limit axial movement of the plug in one direction and an adjustable stop movable longitudinally with respect to said shaft and eccentric for limiting movement of the plug in the opposite axial direction.

12. In infinitely variable transmission apparatus of the character described, a casing having an input shaft rotatably supported therein, a cam adapted to be connected to output apparatus for imparting a driving torque thereto when the cam is rotated eccentrically about the longitudinal axis of said shaft, means interposed between said shaft and cam for rotating the cam when said shaft is rotated, said means being movable longitudinally along the shaft but being constrained against rotational movement with respect thereto, and means interconnecting said cam and first mentioned means to provide for movement thereof along the longitudinal axis of said shaft, said last mentioned means being connected with said cam for rotating the same concentrically about the longitudinal axis of said shaft when the cam is in one axial position thereon and for rotating the cam eccentrically when the cam is in other axial positions thereon and a counterweight movably carried by said first mentioned means for balancing said cam.

13. The transmission of claim 7 in which said plug is equipped with an additional eccentric axially aligned with the eccentric thereof carrying said cam, and in which a second counterweight is threadedly mounted upon said additional eccentric.

14. The apparatus of claim 8 in which said plug is equipped with an additional eccentric axially aligned with the eccentric thereof carrying said cam, and in which a second counterweight is threadedly mounted upon said additional eccentric.

References Cited in the file of this patent

UNITED STATES PATENTS

| | | |
|---|---|---|
| 266,882 | Porter | Oct. 31, 1882 |
| 1,869,055 | Engel | July 26, 1932 |
| 1,875,854 | Cooper | Sept. 6, 1932 |
| 2,256,903 | Joyner et al. | Sept. 23, 1941 |
| 2,357,008 | Joyner et al. | Aug. 29, 1944 |
| 2,547,453 | Egy | Apr. 3, 1951 |

FOREIGN PATENTS

| | | |
|---|---|---|
| 833,533 | France | Oct. 24, 1938 |